(12) United States Patent
Le Roux et al.

(10) Patent No.: US 6,182,205 B1
(45) Date of Patent: Jan. 30, 2001

(54) MICROCOMPUTER PC-CARDS

(75) Inventors: Jean-Yves Le Roux, Bouc Bel Air; Patrice Peyret, Aix en Provence, both of (FR)

(73) Assignee: Gemplus Card International, Gemenos (FR)

(*) Notice: Under 35 U.S.C. 154(b), the term of this patent shall be extended for 0 days.

(21) Appl. No.: 09/209,656

(22) Filed: Dec. 10, 1998

Related U.S. Application Data

(62) Division of application No. 07/993,597, filed on Dec. 21, 1992, now Pat. No. 5,875,480.

(30) Foreign Application Priority Data

Jan. 14, 1992 (FR) .................................................. 92 00321

(51) Int. Cl.[7] .................................................. G06F 15/00
(52) U.S. Cl. .......................... 712/38; 256/679; 713/193
(58) Field of Search .................................. 257/679, 922; 712/32, 33, 36, 37, 38; 713/172, 193

(56) References Cited

U.S. PATENT DOCUMENTS 4,985,921   1/1991   Schwartz .............................. 380/24

*Primary Examiner*—John A. Follansbee
(74) *Attorney, Agent, or Firm*—Roland Plottel

(57) ABSTRACT

The invention relates to exchangeable memory or PC-cards with several integrated circuits for personal computers. These PC-cards are used as a large capacity mass memory for replacing floppy disks and other exchangeable magnetic supports. To protect the content of these PC-cards against unauthorized use, the invention proposes the incorporation into the card (CC) of a specific security integrated circuit chip (MPS), which performs a clearance function for access to the memory chips (MEM). A microcontroller (MPC) also placed in the card communicates with the computer and with the security circuit. It makes the security chip validate a confidential code introduced from the computer, while also supplying memory chip control signals as a function of the validation result.

9 Claims, 2 Drawing Sheets

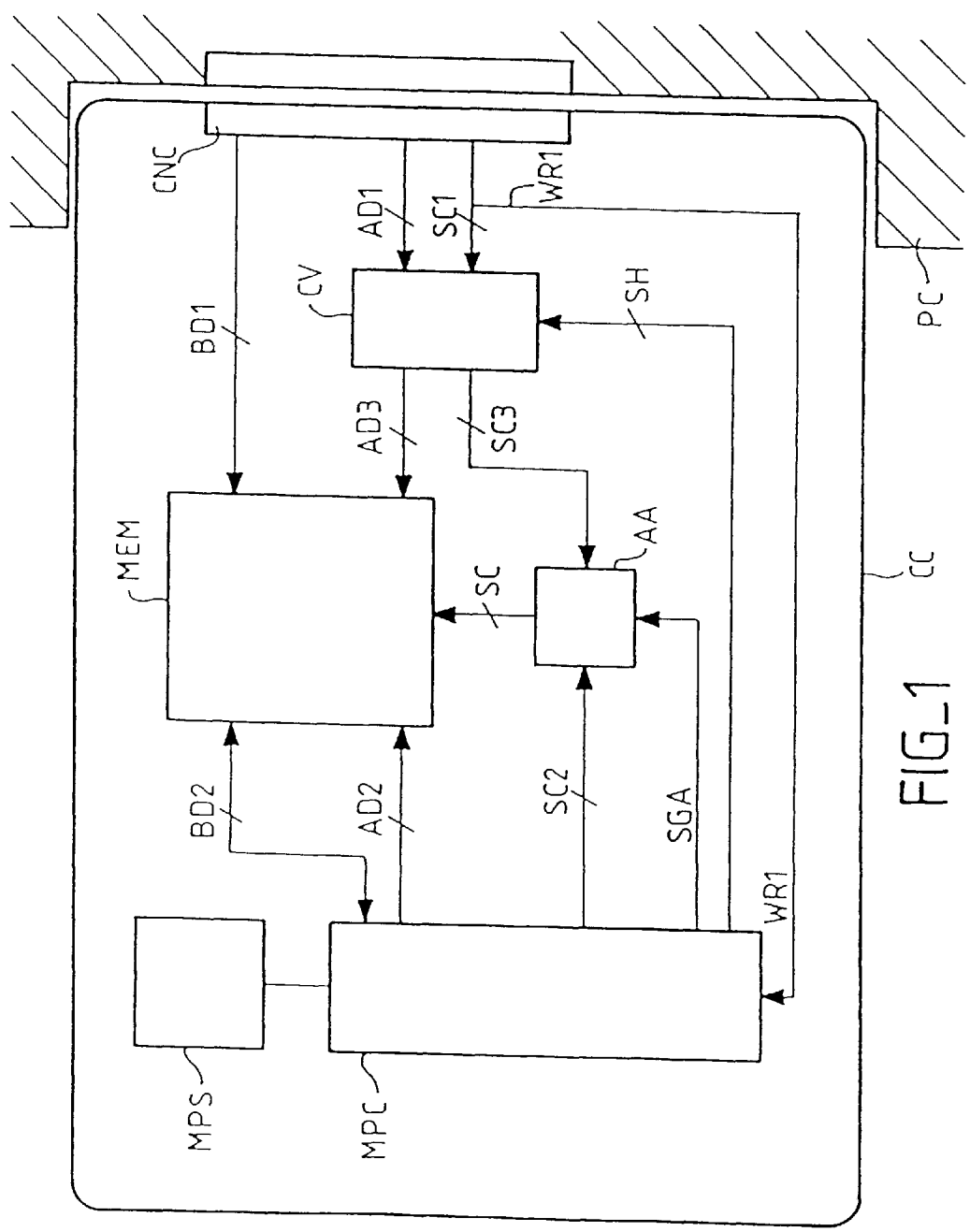
FIG_1

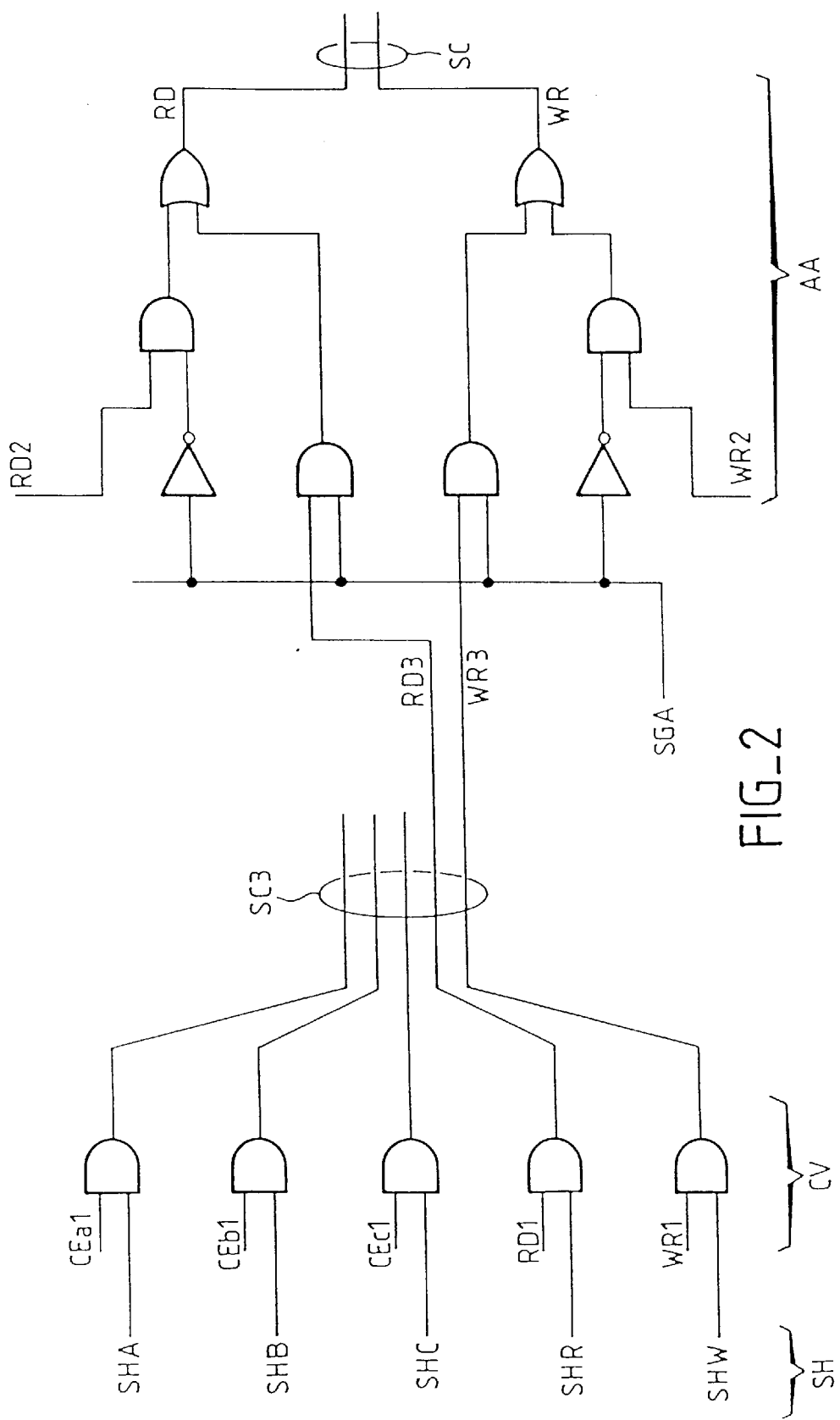
FIG_2

MICROCOMPUTER PC-CARDS

This application is a division of application Ser. No. 07/993,597, filed Feb. 21, 1992, now U.S. Pat. No. 5,875, 480.

FIELD OF THE INVENTION

Exchangeable mass memory or PC-cards for microcomputers or personal computers (PC) have recently appeared as personal computer accessories, particularly for portable computers. In future, they could replace floppy disks and other magnetic mass storage means. They can be used as a mass memory having the same capacity as magnetic floppy disks (approximately one million bytes). Their size is no greater (credit card size with a thickness of 3 to 5 mm). They have a much faster access (several thousand times faster).

They can even be used as a random access memory for a program directly performable by the microcomputer. In this case and unlike in the case of magnetic mass memories, they do not have to be unloaded into the random access memory (RAM) of the PC to permit subsequent performance. The programs which they contain are directly performable by the PC. Mass memory or PC-cards have several memory chips and a connector (68 pin female connector according to the PCMCIA standard of the Personal Computer Memory Card International Association, 1030B East Duane Avenue, Sunnyvale, Calif.). The card can be plugged into a corresponding male connector of the computer. The connections are such that the memory can be addressed by a parallel input-output port of the PC, either as if the memory was a magnetic mass memory, or as if it was an extension of the RAM of the computer.

According to the invention, it was considered necessary to provide maximum security for the PC-cards for personal computers. Thus, their large capacity means that they can contain either significant data bases which have to be protected both during reading and writing, or expensive programs which are not to be used or duplicated without authorization. They may also be used for carrying out confidential transactions in accordance with more sophisticated programs than those existing at present, or involving larger data quantities than can be stored by secure transaction chip cards, which only have a single chip.

The presently available solutions for ensuring a certain security are indicated below.

It is firstly possible to use the sane protection types as for magnetic memories. Among these there is a possibility of concealing files by software attributes making them invisible to the user, when the latter attempts to obtain access thereto by the microcomputer. This is a standard solution for PC's operating under the DOS system. However, it is known that a well-informed user can easily get round these protections by software accessing the attributes of the files and modifying them, so that only scant protection is in fact provided.

It is also possible to use the conventional protections employed by software manufacturers in order to protect the software against copying. These solutions are of varying effectiveness and do not provide protection against use.

Finally, it is known to use security chip cards for protecting a computer or other equipment against use by unauthorized users. This solution will be described in greater detail hereinafter.

PRIOR ART

In order to ensure an access authorization to a PC, it has been proposed to add to the latter a security chip card reader, which is connected to the PC. The keyboard and screen of the computer are used as the interface for ensuring a data exchange with a view to authorization operations. The chip card has a single chip, which is a security module. The security consists of preventing PC use if the user does not supply adequate confidentiality codes. These codes are introduced from the PC keyboard, in accordance with an especially provided exchange protocol between the PC and the card. It is the PC whose use is to be protected, which is used for ensuring the exchanges. The chip card does not form part of the PC. The user takes away his security card after using the apparatus, so as not to provide free availability to an unauthorized third party. Thus, security is essentially based on the simultaneous possession of the card and a confidential code attributed to the card.

If instead of wishing to provide protection for the overall PC it is wished to provide protection to the PC card to be connected to it (because it is desired that it can be used for others for standard uses), it is then necessary for the security card connected to the card reader associated with the PC to not cause the total inhibition of operation of the PC, but selectively the inhibition of operation of the port to which is connected the PC card.

However, it is considered that this solution has disadvantages and does not provide adequate security against an undesired use of the card.

SUMMARY OF THE INVENTION

The invention proposes an original solution consisting of incorporating into the exchangeable PC card, which has several integrated memory circuits, at least one integrated security circuit able to control access to the storage areas of the mass memory.

The control takes place as a function of clearance informations which the user must supply via the computer (confidential code introduced into the keyboard or other clearance mode).

The term security circuit is here understood to mean a single integrated circuit chip having a non-volatile memory with confidential informations which cannot be transmitted to external terminals of the integrated circuit and a programmed security circuitry able to use said confidential informations and other informations supplied by the user, in order to provide validation instructions after the verification of a predetermined relationship between these two information types, the confidential data not passing to the outside of the integrated circuit.

The security circuit is preferably the same as the single circuit of an authorization or clearance chip card (that to which reference was made hereinbefore and which can be used for authorizing the operation of a computer when the user introduces it into the computer). However, in this case use is not made of an exchangeable clearance card used for authorizing the operation of the computer or connection port with the mass memory. A security chip is directly placed in the mass memory in order to secure its content.

It should be noted that the security chips used for protecting during reading or writing the data of a memory have hitherto only been used for protecting the content of the memory within the actual chip, making use of the fact that in the case of a single chip the data to be protected are not transmitted outside the chip. In addition, they were not mass memories, being instead very small memories, because in fact they were placed in the chip. In addition, the security chips used for protecting other apparatuses were incorporated into a separate security card with respect to the apparatus to be protected, said card being carried by the authorized user and not left behind in the apparatus to be protected. In this case use is not made of a chip card separate from the apparatus to be protected and transportable away from said apparatus, but instead an integrated circuit chip non-removably installed in the memory card, whose use is to be protected.

As a result of this arrangement a file protection is obtained both during reading and/or writing, which is significantly superior to that obtained by standard means (of the software type: concealed files) for the protection of personal computer files.

The security chip (referred to hereinafter also by the term security module) directly or indirectly controls the access means to the different card memory chips.

In practice, preference is given to the use of a standard security chip, i.e. of the type used in security cards for accessing apparatuses or rooms, or also in secure transaction cards. These chips use a series communication mode and in general only have six or eight connection pads with the outside, whereof there is only one data or instruction communication pad.

It is then preferable to place in the memory card a supplementary chip constituting a control processor for the card. This processor or micro controller has the function of providing an interface between the card connector and the security chip and an interface between the security chip and the memory chip. In practice, the performance of a user clearance verification program could take place under the control of the control processor. Said program could then be contained in a program memory forming part of the same chip as the control processor. Alternatively this program could be contained in part of the mass memory, if said part is connected to an operational bus of the control processor.

The security check has a microprocessor and memories and among the latter electrically programmable and optionally electrically erasable non-volatile memories. The operating program of this microprocessor is in principle recorded in a read-only memory of the chip. However, it could also be partly recorded in an electrically erasable and programmable non-volatile memory. The content of at least some of the non-volatile memories is not accessible in reading on terminals outside the chip. This content is exclusively used by the microprocessor for its own needs and in particular for performing security programs making use of secret codes placed in these inaccessible memories.

It can e.g. be envisaged that the confidential data memory of the security chip contains a clearance word for each memory area of the mass memory. If there are 24 memory chips, it can have 24 different access words. It can also have access hierarchies for accessing several memory areas.

Moreover, for increased security, the data stored in the mass memory can be encoded and the security module has an encoding and decoding program. The memory data can then be communicated across the security module both during reading or writing. The security module can carry out the coding or encoding. However, it can also supply a calculating key to the control processor, which will then itself carry out the coding and decoding (only in the presence of a clearance recognized by the security chip).

BRIEF DESCRIPTION OF THE DRAWINGS

The invention is described in greater detail hereinafter relative to non-limitative embodiments and with reference to the attached drawings, wherein show:

FIG. 1 The architecture of the PC-card according to the invention.

FIG. 2 A circuit detail.

DESCRIPTION OF THE PREFERRED EMBODIMENTS

The card CC shown in FIG. 1 is to be inserted in a personal computer or PC. The card has a standard pluggable connector CNC, preferably of the type defined by the PCMCIA standard and the PC has a corresponding connector for receiving the card.

The card is a memory card, i.e. it is to be used mainly for storing data. For this function, the card either has several different memory types (static or dynamic RAM, ROM, EPROM, EEPROM, FLASHEPROM, constituting the standard types) or a single memory type. If the memories are RAM's, which are essentially volatile, it is possible to have a standby battery for saving the data.

In order to obtain a larger storage capacity several integrated circuit chips are provided, each being a memory chip. These chips are referred to in overall manner by the reference MEM. There can be several dozen chips on the card for large storage capacities of e.g. several megabytes.

The card CC is an exchangeable peripheral of the computer PC. It can be used either as a mass storage peripheral, or as a RAM extension. It is the computer which controls this choice (when a choice is possible, i.e. particularly when there are several memory types in the card).

Apart from the memories MEM, according to the invention the card also has a security module, which is an integrated circuit chip MPS having a microprocessor with small memories and programs for the operation of the microprocessor.

The essential function of this module is to ensure access security to the memories MEM from the computer.

Preferably, the card CC also has a supplementary chip, which is a control processor or microcontroller MPC, i.e. a microprocessor with which are associated program memories. The function of this microcontroller MPC is the emission of access control signals to the memory chips as a function of security informations given by the security module MPS and as a function of access requests made from the PC. It should be noted that this microcontroller has parallel data outputs for directly supplying several memory destination control signals. The security module has in principle only series data outputs on a single input/output terminal and this is why two different chips MPS and MPC are provided with in each case one microprocessor. If the module MPS had parallel data outputs it would not be necessary to have the chip MPC. The functions of these two circuits would be performed by a single microprocessor circuit having program memories corresponding to the different functions to be performed.

The security module MPS acts as a slave compared with the master constituted by the microcontroller MPC.

The memories MEM are connected to the PC by means of several buses, namely an address bus, a data bus and a control signal bus. However, these buses are controlled by a locking or clamping circuit CV, which is itself controlled by the microcontroller MPC, so that access to the memories is not completely free unless authorization is given by the microcontroller MPC.

In the represented embodiment, it is assumed that the locking circuit CV acts on the address bus and on the control signal buses, but not on the data bus. However, other solutions are possible.

This is why one has shown on the one hand a data bus BD1 passing directly from the connector CNC to the memory MEM and on the other hand an address bus passing from the connector to the memory and interrupted by the locking circuit CV. This bus is designated AD1 upstream of the locking circuit on the connector side and AD3 downstream thereof on the memory side. Finally, a control signal bus (SC1 upstream, SC3 downstream) also interrupted by the locking circuit CV is provided. It is provisionally pointed out that another circuit (switching circuit AA) is interposed between the bus SC3 and the memory. Its function is to switch to the memory either the bus control signals SC3 coming from the PC, or control signals of a bus SC2 coming from the microcontroller MPC. Reference will be made to this point hereinaftter. The control signal bus finally leading to the memory is designated SC downstream of the switching circuit.

In the form of an exemplified embodiment, it can e.g. be considered that the control bus SC1 or SC2 or SC3 or SC transporting signals such as reading instructions (RD1, RD2, RD3, RD) or writing instructions (WR1, WR2, WR3, WR) or instructions for selecting one chip from among several chips (CEa1, CEa2, CEa3, CEa for the selection of a memory chip A from among several chips A, B, C or CEb1, CEb2, CEb3, CEb for the chip B, etc.).

The locking or clamping circuit CV is directly controlled by a clearance bus SH from the microcontroller MPC. This bus transports passage authorization or inhibition signals with respect to the control or address signals passing through the locking circuit CV. In exemplified manner, there can be a reading clearance signal SHR, a writing clearance signal SHW, clearance signals for each memory chip SHA for the chip A, SHB for the chip B and SHC for the chip C. The special feature is that the clearance signals came directly from the microcontroller MPC.

Thus, the microcontroller MPC has the possibility of electronically and selectively preventing reading or writing access to certain parts of the card memory MEM.

In order to complete the general description of the architecture of FIG. 1, reference is made to the following points. The microcontroller MPC can access at random the memory MEM. In the simplest case said memory has a double access and this is why one has shown an address bus AD2 and a data bus BD2 between the microcontroller and the memory. However, this solution is not obligatory and a single access memory is also possible. The access by the microcontroller MPC to the memory takes place with the aid of a control signal bus SC2 from the microcontroller. However, as stated, this bus passes through the switching circuit AA. This arrangement aims at permitting an operation of the microcontroller in closed circuit with the memory MEM during certain program phases. A general switching signal SGA from the microcontroller MPC controls the switching circuit AA. Finally, in the general case where requests by the external PC systematically pass through the memory MEM before leading to the microcontroller in order to be interpreted and performed, it is useful for the writing instructions WR1 from the PC to be applied directly to the microcontroller MPC. Thus, the latter knows that a request has been made and can optionally search for an instruction to be interpreted. This is why a direct connection WR1 has been shown between the connector CNC and the microcontroller.

Access to certain memory areas (e.g. certain chips or certain chip areas) is authorized by the microcontroller MPC as a function of previously defined security criteria and as a function of confirmations given by the security module.

The security module is e.g. the integrated circuit chip of the component sold by SGS-THOMSON under reference ST16612, in which is incorporated the non-volatile memory program MCOS of GEMPLUS. This component has the following special features. The memory data are invisible for the user, because they do not transit on the inputs-outputs of the chip. They are also optically invisible (masked). The chip has a microprocessor and it alone can seek and process the stored data. The ROM programs are carried out by masking and can consequently not be modified. These programs do not authorize access to all the memory areas of the chip. When a secret clearance code is presented on the chip inputs, it is processed by the microprocessor which, in response, supplies clearance or inhibition signals and at no time is it possible to detect the nature of the verification processing on the chip input/output terminals.

The procedure e.g. takes place in the following way. The insertion of a PC-card into the computer initiates the following operations: request by the PC for the user's clearance confidential code, which is introduced by the user on the PC keyboard in accordance with a standard parallel communication protocol for a PC. It is transmitted to the control processor MPC of the card and retransmitted by the latter to the security module MPS in a format comprehensible for the latter (consequently in principle in series form on the single input/output terminal available on the chip MPS). The security module verifies the confidential code and transmits to the control processor a control word representing the state of authorizations given (total inhibition, total authorization, partial authorization for certain memory areas). The control processor MPC receives this word in series form and then establishes on the bus SH the corresponding clearance signals (SHA, SHB, SHC, SHW . . . ), which control the access to the various memory chips. The control processor then returns to the PC a state word indicating that the security procedure has been carried out and indicating the result of this procedure.

In this system it is clear that it is the microcontroller MPC which controls the PC-card security programs. It defines the authorizations and inhibitions and uses the security module as a specialized verification member for a clearance by confidential code. No access security operation is controlled by the PC.

The locking and switching circuits CV and AA are extremely simple wired logic circuits. An example thereof is given in FIG. 2 in order to facilitate the understanding of the principle of the invention.

It is e.g. assumed that access to the various memory chips in reading and writing requires the presence of chip selection signals ("chip enable") CEa, CEb, CEc for chips A, B, C respectively and the presence of reading RD or writing WR instructions. The signals CEa, CEb, CEc consequently form in the present example the content of the control bus SC leading to the memory MEM.

Access requests are formulated by the external PC in the form of signals CEa1, CEb1, CEc1, RD1, WR1 on the bus SC1. Signals SHA, SHB, SHC, SHR, SHW are present on the clearance bus SH. Each of these signals controls the opening or closing of a respective AND gate, each of the gates receiving a respective control signal. The outputs of these gates constitute the bus SC3 in FIG. 1, transporting or not the control signals such as received from the PC in accordance with authorizations given by the microcontroller. The control signals transported on the bus SC3 are applied to the switching circuit AA partly shown in FIG. 2.

The switching circuit is controlled by a switching signal SGA. As a function of the state of this signal, transfer takes place to the bus SC (i.e. to the memory MEM) either of the control signals from the bus SC (e.g. RD3, WR3, etc.), i.e.

from the PC under the control of the microcontroller, or the control signals (RD2, WR2, etc.) from the actual microcontroller.

For example, for the switching of reading control signals RD, an AND gate receives RD3 and is controlled by the signal SGA, whilst another receives RD2 and is controlled by the logic compliment of SGA, whilst an OR gate receives the outputs of said two gates and supplies the reading signal RD, which is either RD2 or RD3 as a function of the state of SGA.

The action of the locking or clamping circuit CV has been shown on the control signals only, but it is clear that in accordance with the architecture of FIG. 1, it can also influence the address bits supplied by the PC.

In an increased security structure, the data stored in the memory are encoded by means of a secret key, the secret decoding key is not known to the user. It is contained in the security module. On presentation of a valid clearance code, the security module supplies the secret key to the microcontroller MPC, which can then carry out a decoding program with respect to the memory data and transmit them to the PC in uncoded form. Thus, it is ensured that the data stored in the memory cannot be usefully copied by an unauthorized person. The writing of data into the memory can also take place in encoded form using the same encoding key and this is only possible after recognition of the authorization of the user.

It should be noted that the data are not outputted in encoded form as is the case in certain security applications and instead encoding takes place of the data stored within the memory card so that a copy of said data would not be usable by anyone not authorized to do so. This in particular means that even if the signal SGA or the signals RD or WR were fraudulently used in order to read the data of the card, it still would remain impossible to use said data.

Variants of the invention are possible. For example, it is possible to provide that either the addresses and data freely transit the PC to the memories and conversely when clearance has been given, or for the addresses and/or data to always transit the microcontroller.

In this embodiment it has been assumed that for practical rapid communication reasons with the PC that the card inputs-outputs constitute a parallel connector to the PCMCIA standard. However, in certain cases the output can take place on a contact connector according to the ISO 7816 standard only having a few contacts, including a single series communication mode input-output contact. This gives a large capacity memory card secured to the standard of credit cards and which can be inserted in a conventional credit card reader, provided that the card thickness in the region to be inserted is sufficiently thin to enter the reader slit. A thickness reduced card area could be provided if necessary and would carry the contacts in accordance with ISO 7816.

In order to complete the description, an operational example with increased security is given, in which certain files of the memory MEN are further protected. With each protected file is associated a particular "signature", which represents the file and which is deteriorated if the file is modified. This signature is formed from the actual file content, i.e. it is the concatenation of all the file bits. This signature is stored in a non-volatile and non-accessible memory of the security module. When the file has to be used (and more particularly in the case where it is to be used as a program to be performed by the microcontroller MPC), firstly a check will be made to see that there has been no deterioration of the file. If a deterioration has taken place, any use will be prevented. For this purpose, the microcontroller will firstly recalculate the file signature to which it has access. It will ask the security module what is the expected signature. It will then make a comparison and will only validate use if the signatures correspond. Comparison could take place within the security module. Within the security module there can be the same number of stored signatures as files to be protected. Thus, within the security module there is an "image" of the files to be protected of the memory MEM, in the form of a file of signatures corresponding to the various parts to be protected.

What is claimed is:

1. An electronic device comprising a PCMCIA bus (BD1, AD1, SC1) and a smart card bus (S), and an interface chip (MPC) acts as an adapter between the PCMICIA bus and the smart card bus, and a memory (MEM) connected to the interface chip (MPC), a secure smart card chip (MPS) connected to the smart card bus (SC), and the smart card chip (MPS) and the memory (MEM) communicate via the interface chip (MPC).

2. A device as in claim 1, wherein the interface chip (MPC) is a programmable microprocessor device.

3. A device as in claim 1, wherein the smart card chip (MPS) comprises a programmable microprocessor chip.

4. A device as in claim 1, wherein the smart card chip (MPS) comprises cryptographic algorithms and can execute said cryptographic algorithms internally in said chip.

5. A device as in claim 1, wherein data transmitted to and/or received from the memory (MEM) can be cryptographically processed by the smart card chip.

6. A device as in claim 1, wherein the smart card bus between the smart card chip (MPS) and the interface chip (MPC) complies to ISO standard IS7816-3.

7. A device as in claim 1, further comprising peripheral connector (CNC), a signal bus (SC1, SC:SC), wherein the interface (MPC) chip is linked by the signal bus to the peripheral connector.

8. A device as in claim 7, wherein an external device (PC) pluggable into the peripheral connector (CNC) can communicate with the smart card chip via the interface chip (MPC).

9. A device as in claim 1, further comprising a peripheral connector (CNC), and wherein an external device (PC) pluggable into the peripheral connector (CNC) can communicate with the smart card chip via the interface chp (PMC).

* * * * *